May 27, 1930.  B. P. WELLAND  1,759,926
HORSESHOE FASTENER
Filed July 26, 1929
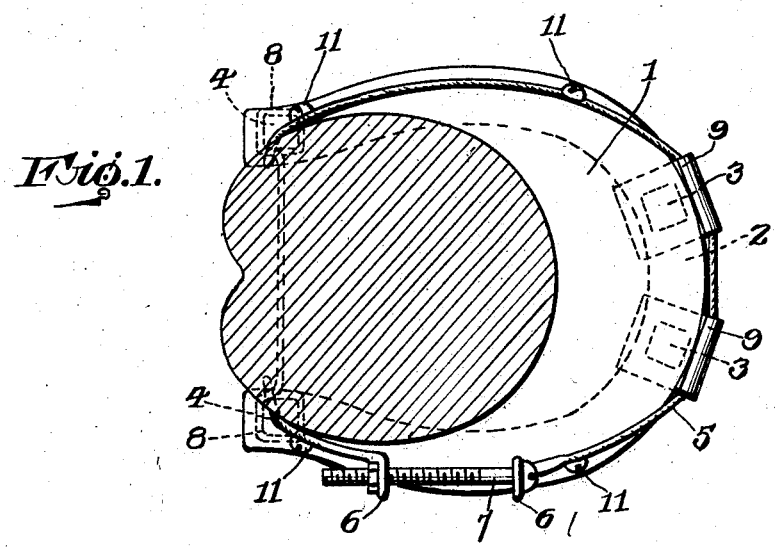
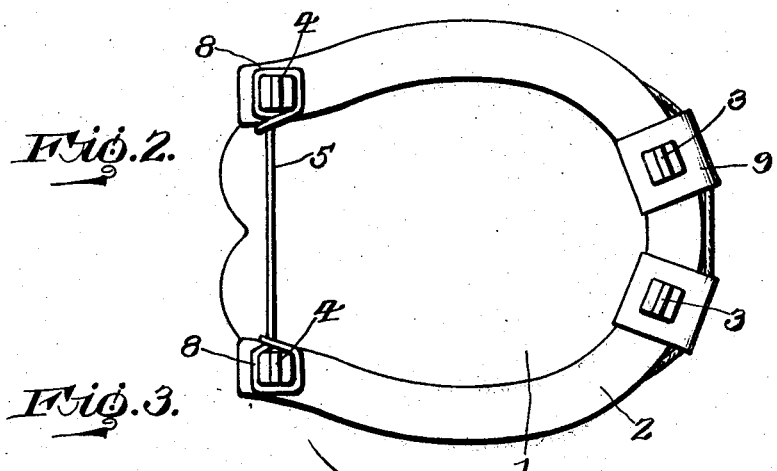
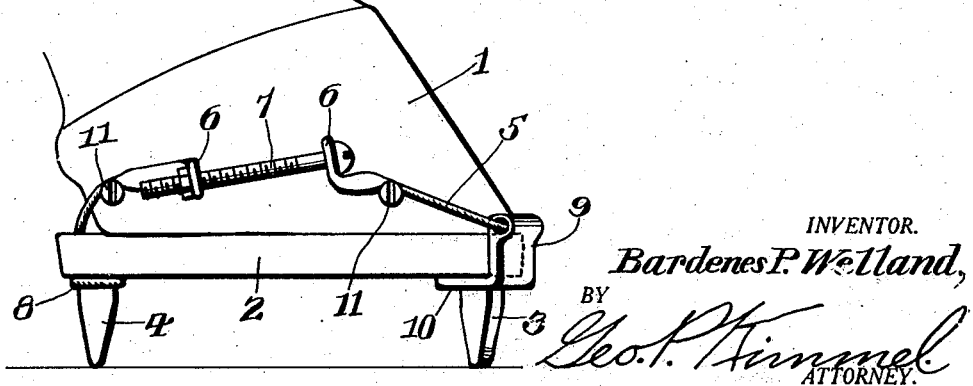
INVENTOR.
Bardenes P. Welland,
BY
Geo. P. Kimmel
ATTORNEY.

Patented May 27, 1930

1,759,926

UNITED STATES PATENT OFFICE

BARDENES P. WELLAND, OF ALBERT LEA, MINNESOTA

HORSESHOE FASTENER

Application filed July 26, 1929. Serial No. 381,237.

This invention relates to horseshoe fasteners, and has for its primary object to provide, in a manner as hereinafter set forth, a new and improved means for efficiently securing a horseshoe to the hoof of an animal without the necessity of passing nails or the like through the shoe and driving them into the hoof.

A further object of the invention is to provide a device of the character aforesaid, by means of which a shoe may be quickly and conveniently tightened in case the same should work loose after long use.

With the foregoing and other objects in view, the invention consists of the novel construction, combination, and arrangement of parts as hereinafter more particularly described, and as illustrated in the accompanying drawings wherein is shown an embodiment of the invention; but it is to be understood that the drawings and description are to be taken as illustrative, and the invention is intended to be limited only by the scope of the claims hereunto appended.

In the accompanying drawings in which like numerals are employed to designate like parts throughout the same:—

Fig. 1 is a top plan of my improved fastener showing the same in operative position on the hoof of an animal, Fig. 2 is a bottom plan thereof, and Fig. 3 is a side elevation thereof.

Referring to the drawings in detail, the numeral 1 indicates the hoof of a horse, to which is secured a shoe 2 which includes a pair of forward calks 3 and a pair of rearward calks 4.

My improved means for securing the shoe 2 to the hoof 1 includes a length of wire 5 which is adapted to be passed partially around the hoof 1. The ends of the wire 5 are provided with loops 6 which are arranged in spaced relation and which are adapted to be drawn towards each other by means of a bolt 7 which passes through the loops 6. The wire 5 is secured to the horseshoe by means of a pair of loops 8 formed in the wire, each of which is slipped over one of the rearward calks 4. The wire is further secured to the horseshoe by being passed through a pair of straps 9, each of which has an end portion 10 fitted over one of the forward calks 3. Adjacent each of the calks 3 and 4, a supporting element such as a screw 11 is driven into the hoof 1, such screws projecting from the hoof substantially horizontally. The wire 5 passes over the supporting elements 11 whereby the wire is prevented from slipping down on the hoof and whereby the shoe 2 is drawn firmly against the lower face of the hoof when the wire is tightened by means of the bolt 7.

When positioning the shoe on the hoof by means of my improved fastener, the wire 5 is passed through the straps 9 which are anchored to the forward calks 3 and the loops 8 of the wire are slipped over the rearward calks 4. The wire is then positioned over the supporting elements 11 with the looped ends 6 of the wire disposed in opposing spaced relation, and the looped ends 6 are then drawn together by passing the bolt 7 therethrough and tightening the same. Upon tightening the wire by means of the bolt, the shoe is drawn firmly against the lower face of the hoof due to the passage of the wire over the supporting elements 11. If the shoe should become loose, as by stretching of the wire after long use, the same may be readily tightened merely by tightening the bolt 7 to take up any slack in the wire.

It is thought that the many advantages of a fastener in accordance with this invention will be readily apparent, and although the preferred embodiment of the invention is as illustrated and described, it is to be understood that changes in the details of construction may be resorted to, so long as such changes fall within the scope of the invention as defined in the appended claims.

What I claim is:

1. A horseshoe fastener comprising a length of wire for passing around a hoof with the ends thereof in spaced relation, means for securing the wire to the shoe, a plurality of supporting elements projecting horizontally from the hoof for the passage of the wire thereover, and means connected with said spaced ends for drawing them toward each other.

2. In a fastener for a horseshoe of that type including forward and rearward calks, a length of wire for passing around a hoof with the ends thereof in opposing spaced relation, said wire being formed with loops encircling the rearward calks, means for securing the wire to the forward calks, means to prevent the wire from slipping downwardly on the hoof, and means connected with said spaced ends for drawing them towards each other.

3. In a fastener for a horseshoe of that type including forward and rearward calks, a wire for passing around a hoof with the ends thereof arranged in opposing spaced relation, means for securing the wire to the rearward calks, straps anchored to the forward calks and having said wire extended therethrough, means to prevent the wire from slipping downwardly on the hoof, and means connected with said spaced ends for drawing them toward each other.

In testimony whereof, I affix my signature hereto.

BARDENES P. WELLAND.